US009110232B2

(12) United States Patent
McGinnis et al.

(10) Patent No.: US 9,110,232 B2
(45) Date of Patent: Aug. 18, 2015

(54) THERMALLY COMPENSATED ARRAYED WAVEGUIDE GRATING ASSEMBLIES

(71) Applicant: NeoPhotonics Corporation, San Jose, CA (US)

(72) Inventors: Brian P. McGinnis, Livermore, CA (US); Anthony J. Ticknor, Cupertino, CA (US)

(73) Assignee: NeoPhotonics Corporation, San Jose, CA (US)

( * ) Notice: Subject to any disclaimer, the term of this patent is extended or adjusted under 35 U.S.C. 154(b) by 18 days.

(21) Appl. No.: 13/951,656

(22) Filed: Jul. 26, 2013

(65) Prior Publication Data
US 2013/0308904 A1 Nov. 21, 2013

Related U.S. Application Data

(63) Continuation-in-part of application No. 13/152,965, filed on Jun. 3, 2011, now Pat. No. 8,538,212.

(51) Int. Cl.
*G02B 6/34* (2006.01)
*G02B 6/12* (2006.01)
*G02B 6/35* (2006.01)

(52) U.S. Cl.
CPC ........ *G02B 6/12026* (2013.01); *G02B 6/12014* (2013.01); *G02B 6/12021* (2013.01); *G02B 6/12033* (2013.01); *G02B 6/3566* (2013.01); *G02B 6/3576* (2013.01)

(58) Field of Classification Search
CPC .......... G02B 6/12009; G02B 6/12019; G02B 6/12026; G02B 6/1203; G02B 6/12033
See application file for complete search history.

(56) References Cited

U.S. PATENT DOCUMENTS

| 5,002,350 | A | 3/1991 | Dragone |
| 5,745,616 | A | 4/1998 | Zirngibl |
| 5,930,439 | A | 7/1999 | Ojha et al. |
| 5,982,960 | A | 11/1999 | Akiba et al. |

(Continued)

FOREIGN PATENT DOCUMENTS

| JP | 2002-258074 A | 9/2002 |
| WO | 2005114288 A1 | 12/2005 |

OTHER PUBLICATIONS

International Search Report and Written Opinion for co-pending PCT Application No. PCT/US2012/040096 dated Dec. 12, 2012 (9 pages).

(Continued)

*Primary Examiner* — Rhonda Peace
(74) *Attorney, Agent, or Firm* — Peter S. Dardi; Curtis B. Herbert; Dardi & Herbert, PLLC

(57) ABSTRACT

Arrayed waveguide grating can have one or both slab waveguides with relatively sharply folded optical paths and a mirror that provides the folding of the path. The folded optical paths through the slab waveguides can result in a more compact geometry of the waveguides through the device as well as smaller slab waveguides such that the device can be formed with a significantly smaller overall footprint. Also, arrayed waveguide gratings that cooperate with pivotable mirrors can adjust light passage through the waveguide in response to temperature changes to provide for thermally compensated operation of the device. Thus, very compact planar lightwave circuits filters are described that provide thermally compensated operation.

16 Claims, 12 Drawing Sheets

(56) References Cited

U.S. PATENT DOCUMENTS

| | | | |
|---|---|---|---|
| 6,122,419 A * | 9/2000 | Kurokawa et al. | 385/31 |
| 6,181,848 B1 | 1/2001 | Bruno et al. | |
| 6,456,763 B2 | 9/2002 | Kashihara et al. | |
| 6,615,615 B2 | 9/2003 | Zhong et al. | |
| 6,678,446 B1 | 1/2004 | McGreer et al. | |
| 6,701,043 B2 | 3/2004 | Delisle et al. | |
| 6,705,925 B1 | 3/2004 | Cole et al. | |
| 6,738,545 B1 | 5/2004 | Purchase et al. | |
| 6,798,948 B2 | 9/2004 | Delisle et al. | |
| 6,842,572 B2 | 1/2005 | Johannessen | |
| 6,954,566 B2 | 10/2005 | Johannessen | |
| 7,062,127 B2 | 6/2006 | Purchase et al. | |
| 7,106,930 B2 | 9/2006 | Shen et al. | |
| 7,160,746 B2 | 1/2007 | Zhong et al. | |
| 7,447,394 B2 | 11/2008 | Ho et al. | |
| 7,539,364 B2 | 5/2009 | Cole et al. | |
| 7,720,328 B2 | 5/2010 | Yan et al. | |
| 8,340,484 B2 | 12/2012 | Vasilyev et al. | |
| 2001/0033714 A1 | 10/2001 | Delisle et al. | |
| 2001/0033715 A1 | 10/2001 | Delisle et al. | |
| 2002/0097961 A1 | 7/2002 | Kazarinov et al. | |
| 2004/0208417 A1 | 10/2004 | Purchase et al. | |
| 2005/0129363 A1 | 6/2005 | McGreer | |
| 2010/0278483 A1 | 11/2010 | Hasegawa et al. | |
| 2011/0164879 A1 | 7/2011 | Vasilyev et al. | |
| 2012/0308176 A1 | 12/2012 | McGinnis | |
| 2013/0308904 A1 * | 11/2013 | McGinnis et al. | 385/37 |

OTHER PUBLICATIONS

European search report for co-pending European application No. 12792666.5 dated Mar. 24, 2015 (8 pages).

* cited by examiner

THERMALLY COMPENSATED ARRAYED WAVEGUIDE GRATING ASSEMBLIES

CROSS REFERENCE TO RELATED APPLICATIONS

This application is a continuation-in-part of copending U.S. patent application Ser. No. 13/152,965 filed Jun. 3, 2011 to McGinnis, entitled "Thermally Compensated Arrayed Waveguide Grating Assemblies," incorporated herein by reference.

TECHNICAL FIELD OF THE INVENTION

The technical field relates to arrayed waveguide gratings that cooperate with components to adjust light passage through the waveguide in response to temperature changes. The technical field also relates to network integration of thermally compensated arrayed waveguide gratings.

BACKGROUND OF THE INVENTION

Optical networks generally comprise transmission components that are designed to transmit bands of wavelengths over reasonable distances. The bands of wavelengths generally comprise signals intended for a plurality of customers/users. Thus, a single optical fiber can be used to simultaneously transmit a plurality of signals that are subsequently divided for delivery. Similarly, individual signals are combined for transmission over common lines prior to eventual division for routing and/or delivery. Individual bands thus are divided into smaller wavelength ranges corresponding to signals relating to individual users, including aggregations of a few users, and multiplexing and de-multiplexing functions can be used to convert between combined signals for common lines and individual signals for routing and/or interfacing with individual users.

Arrayed waveguide gratings (AWG) are optical circuit components that are designed to perform multiplexing and de-multiplexing functions for optical signals. Planar optical circuits provide a convenient format for AWGs that can be placed at desired locations within an optical network. An AWG generally comprises two broadly transmitting optical elements, such as slab waveguides, that are connected by an array of waveguides with a range of lengths. The length differences of the dispersive waveguide array are selected to result in appropriate constructive and destructive interference within a slab waveguide between light transmitted by the array of waveguides such that a multi-chromatic signal is spatially spread out by the interference pattern such that smaller wavelength ranges can be separately transmitted following de-multiplexing. Similarly, transmission of light in the opposite direction results in the transmission of a combined multi-chromatic signal relative to a group of input signals with different wavelengths within a range of wavelengths. The arrayed waveguide may this be configured with an integrative side and a dispersive side, with light passage from the integrative side to the dispersive side providing decomplexation of a signal into a multi-chromatic signal, and vice versa, with passage of light from the dispersive side to the integrative side providing integration of a multi-chromatic signal. Basic principles of an AWG are well known in the art and are described for instance in U.S. Pat. No. 5,002,350.

SUMMARY OF THE INVENTION

In a first aspect, the invention pertains to a planar lightwave circuit comprising a combined signal waveguide, a set of dispersed signal waveguides, a first slab waveguide, a first mirror optically connected to the first slab waveguide, a mirror assembly supporting the first mirror, a waveguide array; and a second slab waveguide. The waveguide array optically connects the first slab waveguide and the second slab waveguide to provide an arrayed waveguide grating. In general, the combined signal waveguide or the set of dispersed signal waveguides is optically connected directly at an access edge to the first slab waveguide, and the other of the combined signal waveguide or the set of dispersed signal waveguides is optically connected directly to the second slab waveguide. To advantageously provide a more compact device structure, an optical path through the first slab waveguide from the access edge is folded by providing an optical reflection from a mirror to the array edge connecting the waveguide array and the appropriate element of the combined signal waveguide or the set of dispersed signal waveguides. The configuration of the design of the reflection off of the mirror can yield desirable results at a reflection angle of no more than about 80 degrees, and the ratio of optical path distance from the access edge to the mirror as compared to the optical path distance from the waveguide array to the mirror would generally be from about 0.5 to about 2. In some embodiments, to provide for thermal correction, the mirror assembly comprises an actuator that pivots the mirror along a rotation in the plane of the slab waveguide in response to a change in temperature to change the reflection angle to provide effectively temperature compensated transmission of light through the arrayed waveguide circuit over a selected temperature range.

In a further aspect, the invention pertains to a planar lightwave circuit comprising a combined signal waveguide, a set of disbursed signal waveguides, a first slab waveguide comprising a first access edge and a first array edge, a first mirror optically connected to the first slab waveguide, a second slab waveguide comprising a second access edge and a second array edge, a second mirror optically connected to the second slab waveguide, and a waveguide array optically connecting the first slab waveguide to the second waveguide through respective array edges. In some embodiments, each slab waveguide has a folded optical path between the respective access edge and the respective array edge, reflecting off of a mirror at an angle of no more than about 80 degrees and having a ratio of the distance from the access edge to the mirror compared to the distance from the array edge to the mirror being from about 0.5 to about 2.

In additional aspects, the invention pertains to methods of preparing the planar lightwave circuits comprising adjusting an actuator at a reference temperature to provide for alignment of a center burst wavelength through the arrayed waveguide grating and sealing the encasement after adjusting the actuator to enclose the thermally compensated optical circuit.

In other aspects, the invention pertains to a planar lightwave circuit comprising a combined signal waveguide, a set of dispersed signal waveguides, a first slab waveguide, a first mirror optically connected to the first slab waveguide, a mirror assembly supporting the first mirror, a waveguide array; and a second slab waveguide. The waveguide array optically connects the first slab waveguide and the second slab waveguide to provide an arrayed waveguide grating. The combined signal waveguide or the set of dispersed signal waveguides is optically connected directly at an access edge to the first slab waveguide, and the other of the combined signal waveguide or the set of dispersed signal waveguides is optically connected directly to the second slab waveguide. To advantageously provide a more compact device structure, an optical path through the first slab waveguide from the access edge is folded by providing an optical reflection from a mirror to the array edge connecting the waveguide array and the appropriate element of the combined signal waveguide or the set of dispersed signal waveguides. The configuration for the design of the reflection off of the mirror can be advantageously at a reflection angle of no more than about 80 degrees and the ratio of optical path distance from the access edge to the mirror as compared to the optical path distance from the waveguide array to the mirror would generally be from about 0.5 to about 2. In some embodiments, the mirror assembly comprises a manually adjustment of the actuator sets the wavelength response of the AWG by tuning the central wavelength to pass at a selected temperature between the combined signal waveguide and the dispersed signal waveguides.

In additional aspects, the invention pertains to a method for adjusting the optical path through a dispersive element of a planar lightwave circuit comprising a combined signal waveguide, a set of dispersed signal waveguides, a first slab waveguide, a first mirror optically connected to the first slab waveguide, a mirror assembly supporting the first mirror, a waveguide array, and a second slab waveguide. The waveguide array generally optically connects the first slab waveguide and the second slab waveguide to provide an arrayed waveguide grating (AWG). In general, the combined signal waveguide or the set of dispersed signal waveguides is optically connected at an access edge to the first slab waveguide, and the other of the combined signal waveguide or the set of dispersed signal waveguides is optically connected to the second slab waveguide. In some embodiments, an optical path through the first slab waveguide from the access edge is folded by providing an optical reflection from the mirror to the array edge connecting the waveguide array and the appropriate element of the combined signal waveguide or the set of dispersed signal waveguides, and the mirror assembly comprises a manually adjustable actuator that sets the wavelength response of the AWG by tuning the position of the central wavelength optical path. The method can comprises adjusting the actuator through external manipulation to move the first mirror to alter the optical path between the combined signal waveguide and the dispersed signal waveguides.

DETAILED DESCRIPTION OF THE INVENTION

Figure 1:
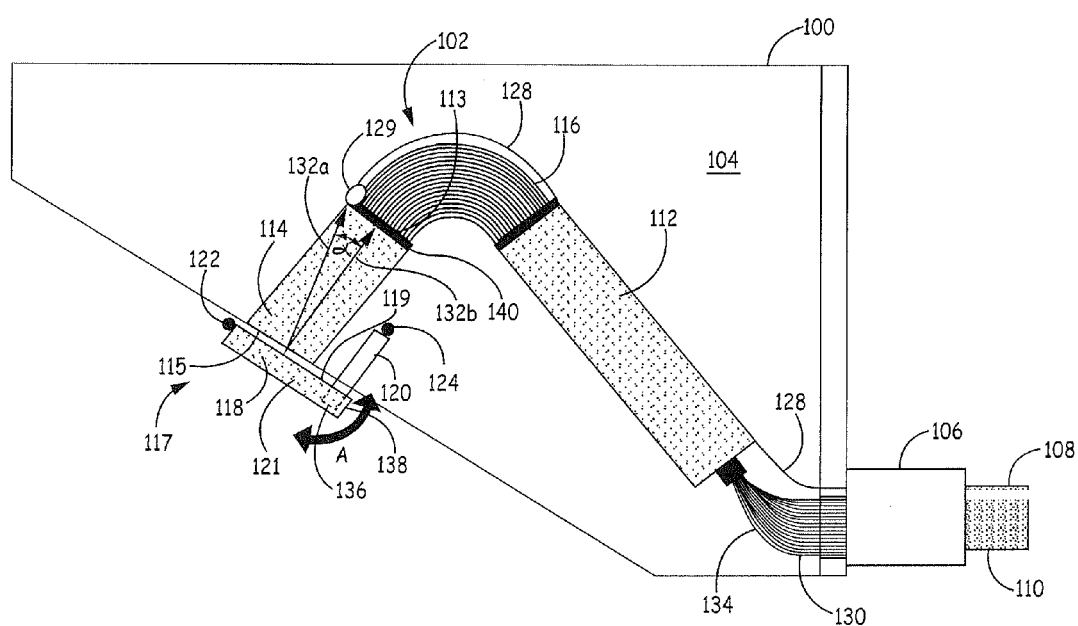
FIG. 1 depicts an embodiment of an optical integrated circuit having a folded slab waveguide with a pivotable mirror that provides a thermal correction to the arrayed waveguide of the circuit.

An improved format for planar arrayed waveguide gratings (AWG) with thermal compensation provides for less expensive processing and a smaller footprint without sacrificing performance. The AWGs have a planar waveguide array with a slab waveguide at both ends of the array. The slab waveguides provide the important functions of spatial dispersion of light that provides for divergence of a beam and/or for interference of signals to provide for spatial wavelength separation. While the dimensions are dictated to a significant degree by the optical requirements, it has been found that the dimensions of the AWG can be significantly reduced using a mirror to fold the optical path through the slab waveguide while essentially retaining the overall path length through the slab waveguide while shrinking the physical size of the slab waveguide. Furthermore, using the innovations described herein enables the waveguides to provide desirable input and output access to be routed adjacent to the core grating. Absent these innovations, AWGs have structures with access waveguides routed away from the core grating. The adjacent routing of the access waveguides provides a much more efficient use of the optical circuit area, allowing substantial reduction for the practical size of the AWG device. Thus, desired size reductions result from both a reduction in the size of the slab waveguide(s) as well as from improved placement of the positions of the input and output access waveguides. Due to the smaller footprint of the improved devices described herein, a larger number of devices can be patterned onto a substrate, such as a silicon wafer, and this larger number of devices can be correspondingly formed with the same processing capacity for corresponding cost reductions per device.

In this reduced area format, non-powered, or "passive," thermal adjustments can be used to make the small footprint AWG with thermal compensation over practical temperature ranges such that the performance of the AWG is effectively temperature independent. In the art, a component with passive thermal compensation may be referred to as an athermal component even if functional materials in the device experience thermal changes, although passive thermal compensation more precisely describes the functionality of the component. In alternative embodiments, a manual actuator can be used to adjust the path of the center light wavelength through the AWG while taking advantage of the compact format available with the improved designs described herein. The manual adjustment can be performed by a user, generally with the aid of a suitable tool, such as a screw driver or the like, or by an automated system interfaced with the manual actuator to provide for manual adjustment of the actuator. Also, the actuator may be directly responsive to other types of manual adjustment. For instance the actuator may comprise a shape memory alloy (sometimes known as "muscle wire") such that it can provide an additional expansion or contraction based on application of an electrical current. Suitable shape memory alloys for use with electrical actuation include, for example, Flexinol® and MuscleWire®. Such cases may additionally provide passive thermal compensation. Alternatively, configurations with a manually-adjustable actuator may employ other known means of compensating for thermal characteristics, such as actively providing a constant temperature to the device, where an application presents a preference for such other means. Manual and manually are intended to refer herein to any external intervention to provide an input to an actuator that induces the desired adjustment whether or not applied directly by a human being. To achieve particular thermal compensations over a desired temperature range and/or other compensation, a plurality of passive adjustment elements, a plurality of manual adjustment elements, or a combination of passive adjustment element(s) and manual adjustment element(s) can be used in concert to achieve the desired overall thermal compensation and/or other compensation.

Transmission of light signals through AWGs can be compromised by changes in temperature. A change in temperature causes changes in the dimensions and refractive indices of the optical circuit which causes shifts in the center wavelength (CW), or wavelength of peak transmission for a given channel of a photonic integrated circuit (PIC). Optical assemblies incorporating AWGs are described herein that are effectively thermally compensating so that signal integrity is preserved when the temperature changes. It is possible to change the optical path traveling through one or both slab waveguides of the AWG to passively compensate for the effects of temperature changes in the grating. In some embodiments, thermal adjustment of the AWG involves reflecting the signals off of a movable mirror that changes its position and/or orientation with temperature and changes a path of the signal as it is transmitted through the AWG. Some embodiments of the movable mirror involve a pivotable reflector or mirror moved by an actuator that is sensitive to temperature changes. The AWG and associated components for temperature compensation can be referred to in the art as athermal AWGs, meaning that they effectively and naturally compensate for thermal changes that can be encountered in network applications outside of thermally controlled rooms or enclosures so that signal transmission is accomplished. An application for an AWG is directing signals within a network.

While pivoting off a reflector or mirror can provide for thermal adjustment, the mirror can also provide for significant size reduction of the slab waveguides that can correspondingly reduce the overall size of the device. Based on placement of an access edge for a channel waveguide into the AWG component, the optical path through the slab waveguide is split into two sections. By placing the access edge so that the angle between the light path at the access edge and the normal to the mirror is no more than about 45 degrees, the slab waveguide can be reduced significantly in size and correspondingly the two branches of the optical path can be adjusted to differ from each other by no more than about a factor of 2. Thus, the device footprint can be significantly reduced in size while providing for thermal correction.

As described herein the AWG are assembled within a planar lightwave circuit that can be appropriately connected to a longer range optical transmission network. The planar optical circuit generally is formed on a flat substrate with appropriate optical materials, generally a silica-based glass, layered and patterned over the substrate to form the desired optical pathways. Light of an appropriate wavelength range can be constrained to the patterned optical pathways based on refractive waveguiding with appropriate index of refraction differences between the different optical materials as is conventional in the art.

Networks generally involve appropriate switching functions to route signals from a sender to a receiver. To have efficient transmission and routing systems, individual signals are generally combined for longer range transmission along a single optical fiber and later separated for proper routing to the intended recipient. The distinct signals can be identified through using a separate wavelength value or range associated with each distinct signal. While these general principals can extend to various transmission technologies, optical signals are of particular interest herein. Optical signals present the ability to transmit large amounts of information, although optical signals present distinct challenges regarding handling of the optical signals. The AWG devices described herein generally are designed to present requirements for combining or separating up to at least about 8 wavelengths and as many as about 100 wavelengths, with that set of wavelengths generally falling within a span of roughly 40 nm to 60 nm of wavelength range. However, the improved photonic chip designs described herein are more broadly applicable to AWGs that have broader performance ranges than those that are currently used. The central wavelength value of the group generally is designed around the parameters of the optical network and would currently generally fall within the range from about 1250 nm to about 1650 nm, although future network designs may span other wavelength ranges.

The combination of a plurality of signals, e.g., optical signals, for common transmission can be termed multiplexing, which indicates that signals of different wavelengths are combined within a common signal. The separation of the combined signals, e.g., optical signals, having different wavelengths can be referred to as de-multiplexing. Some devices perform multiplexing using optical signals transmitted in one direction and de-multiplexing with respect to optical signals transmitted in the opposite direction so that a common device can be used for both functions. The expressions MUX and deMUX are used herein respectively for multiplexing and demultiplexing functions, and the expression "D/MUX" as used herein indicates the combined or selectable multiplexing and/or de-multiplexing functions of a device or a structure that performs these functions.

A thermally compensating AWG can be designed for use as a MUX, deMUX, or D/MUX device in a network. The AWG may be in an assembly that provides for ready connection to optical signal sources, such as optical fibers. In alternative or additional embodiments, the AWG can be hard connected to corresponding optical signal sources that may then extend from a housing for integration into the optical network. The assembly may be placed in single housing that accepts connections or has connections to a polychromatic optical signal carrier and a dispersed optical signal carrier. The first and second carriers may be an input or an output, bearing in mind that the terms input and output are arbitrary in light of the D/MUX functionality of the AWGs. The term optical signal carrier, in this context, is broad and refers to optical fibers, a fiber bundle, a fiber ribbon, waveguides, or other signal-transmitting component(s). The optical signal carrier may be part of a network and operably connectable to an AWG.

One approach for providing a thermally compensating AWG is set forth in U.S. Pat. No. 7,062,127 to Purchase et al., entitled "Athermal AWG and AWG With Low Power Consumption Using Groove of Changeable Width," hereby incorporated herein by reference. The structures in the '127 patent can involve placement of an AWG across a two-piece base that had a groove or gap between the pieces. An actuator changes length in response to temperature changes to adjust the relative positions of the base pieces to provide a thermal correction. Mirrors could be incorporated into the AWG, along with certain folding schemes for the AWG slab waveguide. The folding schemes generally involved a multi-faceted slab waveguide with one face devoted to receiving an optical signal and a mirror for reflecting the signal out through another face. The faces were spaced apart and oriented away from each other and the angle between the incident and reflected light was approximately perpendicular so that the spatial requirements for the slab waveguide were substantial. A thermal adjustment was provided by mounting the mirror and the slab waveguide on separate pieces of the base joined by a hinge so that an actuator could move the pieces of the bases relative to each other around the hinge and change the relative positions of the mirror and slab waveguide.

Another approach for forming a relatively compact AWG is presented in U.S. Pat. No. 5,745,616 to Zirngibl, entitled "Waveguide Grating Router and Method of Making Same Having Relatively Small Dimensions," hereby incorporated herein by reference. As described in the '616 patent, free space regions are used for the spreading of the light adjacent the ends of the waveguide array. Mirrors were proposed to fold the free space regions. These folding schemes generally involved using two approximately perpendicular faces as already described, or schemes that use two mirrors in a slab waveguide instead of a single mirror. In contrast, the approaches described herein can avoid the requirement for two mirrors in a waveguide. Further, some embodiments provide for a tighter folding of a slab waveguide so that a more significant reduction in the size can take place. Also, configurations taught herein also include those providing for efficient thermal correction using a pivoting mirror.

We further note that the '616 patent is directed to InP waveguides which are based on a very large values of index-of-refraction of about 3.5 and corresponding large index contrasts. With the large index-of-refraction values, large losses can be experienced with transmission through a surface at angles away from the normal line, so that the design considerations are significantly different from corresponding considerations for silica based glasses. The '616 patent thus teaches away from interfaces with spaced apart optical components such as a pivoting mirror. The designs described herein enable the combined advantages of improved interaction of components arranged around the slab waveguides while enabling the use of components that extend beyond the edge of the optical components to accommodate a pivoting mirror or the like. For the devices described herein, the free space, for example, between a slab waveguide and a mirror can be filled with index matching compositions, such as gel, grease or adhesive, which do not inhibit the pivoting of the mirror. In the devices described herein, the optical path outside of the chip can be made sufficiently short to be within the range of the beam-waist of the waveguide signal, thereby avoiding diffractive losses without using additional optical components for beam management.

Another approach for making thermal corrections in an AWG is set forth in U.S. Pat. No. 6,701,043. An optic fiber is connected to a lens that provides light to the AWG. The lens has a mirror that can be moved in response to thermal changes. The extra lens for the AWG represents a source for cost and manufacturing complexity. The lens is an extra optical element that can reduce efficiency of the optics. Furthermore, the optical path through the slab waveguide is not significantly folded, so the '043 patent does not teach a significant reduction in size of the slab waveguide. In contrast, a folded slab waveguide is provided herein with a reflecting surface that receives light from the waveguide and directly reflects the light back into the waveguide, i.e., with no intervening optical elements, and the optical path through the slab waveguides described herein provide for significant folding of the optical path through the slab waveguide to provide for significant reduction in the footprint of the slab waveguide.

FIG. 1 depicts an embodiment of a thermally compensating AWG that provides significant improvement based on a compact folded optical path through the slab waveguide and low loss without the use of a lens through the placement of a mirror with a very small spacing from the edge of the slab waveguide while maintaining sufficient distance for adjustment to provide thermally compensated operation. Chip 100 comprises an optical assembly 102 on substrate 104, with dual connector 106 providing optical connectivity between first network optical signal carrier 108 and second network optical signal carrier 110. Optical assembly 102 has first slab waveguide 112, second slab waveguide 114, and arrayed waveguide 116 that are optically connected to provide an arrayed waveguide grating. Slab waveguide 114 has access edge 113 and reflection edge 115. Optical assembly 102 further has mirror assembly 117 that comprises mirror 118 with reflecting surface 119 and actuator 120.

Mirror assembly 117 is connected to chip 100 adjacent to substrate 104 by hinge 122. Actuator 120 is supported with fastener 124. The fastener may be affixed directly or indirectly to support 104, chip 100, or otherwise secured to accommodate actuator 120. The hinge and/or mirror assembly and/or fastener may be fastened directly to the chip or the substrate. The optical integrated circuit may be created in a single material (monolithic) with the mirror assembly fastened directly to the material. In the embodiment of FIG. 1, for example, the mirror assembly and the actuator are both connected only to substrate 104, and the PIC is monolithic. Waveguide 128 is optically connected to network carrier 108 and to connection point 129 for optical connectivity to access edge 113 of slab waveguide 114. In alternative embodiments, waveguide 128 can be replaced with a plurality of a few waveguides, e.g. 2-5 waveguides, to provide or receive multiplexed optical signals. Internal carrier 130 is optically connected to slab waveguide 112. A light signal passing through network carrier 108 is communicated to internal carrier 128 and through access edge 113 into slab waveguide 114. The light signal passes through element 114 and in and out of reflecting edge 115 along a path exemplified by arrows 132*a*, 132*b*, with mirror 118 reflecting the signal off of reflecting surface 119 through slab waveguide 114 and into arrayed waveguide 116. The signal passes through arrayed waveguide 116 and through slab waveguide 112 and emerges as decomplexed (dispersed) signals 134 that are received by a set of dispersed signal waveguides 130, which in turn communicates the signals to external carrier 110, which can be a ribbon of optical fibers. Light signals may similarly be traced in reverse order, with the AWG in de-multiplexing (integrative)

mode. The embodiment of FIG. 1 depicts optical signal carriers 108 and 110 joining dual connector 106. A dual connector may be unitary, meaning it has a single housing that fastens to external optical signal carriers to optically couple them to signal carriers internal to the package that comprises the AWG assembly, although other connector designs can be used as desired.

Mirror 118 is pivotable about hinge 122, and may be biased to press against actuator 120. Mirror assembly 117 has mount 121 for mirror 118, and receives a distal portion 136 of actuator 120, e.g., in a slot or other recess. In some embodiments, distal portion 136 is secured to the mirror, and hinge 122 is correspondingly unbiased. Actuator 120 comprises a thermally responsive material that responds to changes in temperature to pivot distal end 138 of mirror 118 as indicated at arrow A. The actuator material may be chosen to have a coefficient of thermal expansion that provides an amount of expansion or contraction as needed to change the path of light through the AWG. The angle $\alpha$ between arrows 132a and 132b indicates an angle between a light ray that is incident on and reflected from mirror 118. Angle $\alpha$ changes as mirror 118 rotates. As the temperature inside package 100 changes, actuator 120 changes length and rotates mirror 118. The rotation of the mirror may be, for instance, between about 0.1 and about 100 milliradians and in further embodiments between about 1 and about 25 milliradians. Artisans will immediately appreciate that all the ranges and values within the explicitly stated ranges of angles are contemplated.

The embodiment of FIG. 1 depicts a folded optical path slab waveguide that has a single access edge 113 for ingress and egress of an optical signal. Arrows 132a, 132b show the entry and exit of an optical signal through access edge 113, with the angle between light entry and exit being shown with the symbol $\alpha$ (alpha). Restricting alpha, provides for a smaller footprint of the folded slab waveguide and the accompanying enclosure (package), and embodiments include an angle no more than about 80 degrees, in some embodiments from about 3 to about 70 and in further embodiments from about 5 to about 60 degrees; artisans will immediately appreciate that all the ranges and values within the explicitly stated ranges are contemplated. The reduced angles for alpha provide for compact AWG format without degradation of signal quality. Since a common access edge 113 is used for both optical connection to a channel waveguide 129 and optical connection to the waveguide array 116, the distances from the respective portions of the optical path, i.e., from channel waveguide 129 to the mirror and from the waveguide array to the mirror, are essentially equal.

Figure 2A:
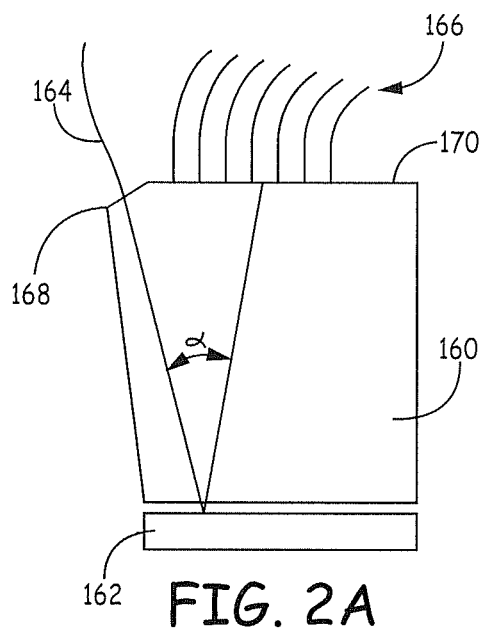
FIG. 2A is a top plan view of a first alternative embodiment of a folded optical path slab waveguide.
Figure 2B:
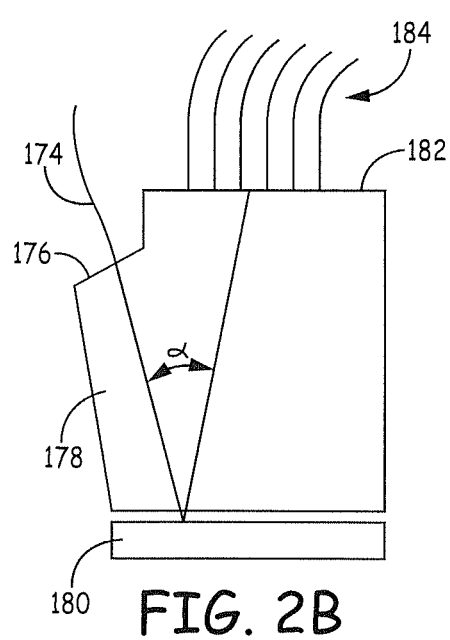
FIG. 2B is a top plan view of a second alternative embodiment of a folded optical path slab waveguide.
Figure 2C:
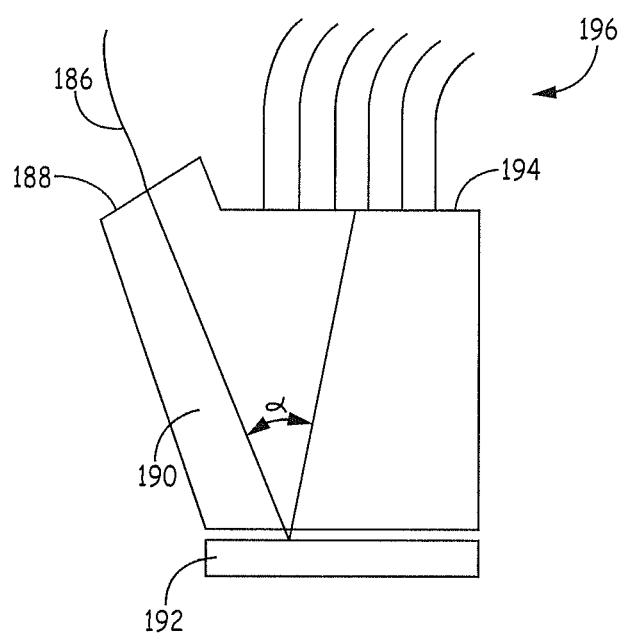
FIG. 2C is a top plan view of a third alternative embodiment of a folded optical path slab waveguide.

Further embodiments of folded optical path slab waveguides are depicted in FIGS. 2A, 2B and 2C. Referring to FIG. 2A, folded optical path slab waveguide 160 is depicted adjacent mirror 162, which may or may not pivot in response to temperature changes. Slab waveguide 160 is further optically connected to channel waveguide 164 and waveguide array 166. Channel waveguide 164 interfaces with slab waveguide 160 at access edge 168, and waveguide array 166 interfaces with slab waveguide 160 at array edge 170. The optical path from channel waveguide 164 reflects off of mirror 162 to reach waveguide array 166 through reflection at an angle alpha. An alternative embodiment is depicted in FIG. 2B. As depicted in FIG. 2B, a folded optical path proceeds between channel waveguide 174 through access edge 176 into slab waveguide 178 off of mirror 180 at an angle alpha through array edge 182 into waveguide array 184. In this embodiment, access edge 176 is displaced toward mirror 180 relative to array edge 182. A further alternative embodiment of a folded optical path slab waveguide is depicted in FIG. 2C.

In this embodiment, a folded optical path proceeds between channel waveguide 186 through access edge 188 into slab waveguide 190 off of mirror 192 at an angle alpha through array edge 194 into waveguide array 196. In this embodiment, access edge 188 is displaced away from mirror 192 relative to array edge 194.

For the embodiments of the slab waveguide in FIGS. 2A and 2B, the ranges of angles described in the context of FIG. 1 are still appropriate, and they apply equally for these configurations of the slab waveguide. In these embodiments, the two branches of the optical path are not generally equal length. Specifically, the distance from the access edge at which the channel waveguide interfaces with the slab waveguide is different from the distance from the mirror to the array edge at which the waveguide array interfaces with the slab waveguide. In general, the ratio of the distance from the access edge to the mirror to the distance from the array edge to the mirror is from about 0.5 to about 2, in further embodiments from about 0.7 to about 1.5 and in further embodiments from about 0.8 to about 1.25. A person of ordinary skill in the art will recognize that additional ranges of distance ratios within the explicit ranges above are contemplated and are within the present disclosure. The channel waveguides depicted in FIGS. 1, 2A, 2B and 2C are shown as a single combined signal waveguide, but these can be replaced with a plurality of combined signal waveguides or a set of disbursed signal waveguides as described further below in the context of alternative embodiments.

Decreasing this angle, depicted as alpha in FIG. 1, creates an opportunity to provide thermal correction with small movements of mirrors that change the angle. The mirrors for the folded slab waveguide are chosen and positioned to reflect light off the mirror's reflecting surface so that the light re-enters the slab waveguide without significant loss. The term significant, in this context, means that any such loss does not prevent accomplishment of signal transmission and in desirable embodiments corresponds to less than 1-dB additional optical loss compared to an equivalent device configured without the improved compact design described herein. Since the adjustment angle for thermal correction can be small, the mirrors may be placed with a small gap between the reflecting surface of the mirror and the face of the slab waveguide that passes light to that surface (referred to as the reflection edge). The gap may range from about 1 micron to about 50 microns; artisans will immediately appreciate that all the ranges and values within the explicitly stated ranges are contemplated, e.g., from about 2 microns to about 20 microns or less than about 10 microns. A fluid, gel, flexible adhesive or the like can be placed in the gap for index matching purposes without significantly inhibiting the pivoting of the mirror, and suitable compositions are known in the art and are subject to commercial improvements over time. The reflecting surface of the mirror may be pivoted by a small amount to accomplish a thermal correction, from about +50 milliradians to about −50 milliradians from nominal; artisans will immediately appreciate that all the ranges and values within the explicitly stated ranges are contemplated, e.g., from about +10 milliradians to about −10 milliradians from nominal or in some embodiments from about +3 milliradians to about −3 milliradians from nominal. The term pivoted means a movement that causes a change in the angle of light reflected off the surface.

The term mirror includes reflective materials suited to reflection of an optical signal in the desired operating wavelength range. Accordingly, the term mirror includes optical reflectors, metal coated mirrors, e.g., silvered mirrors, substrate mirrors, total-internal reflection mirrors, periodic reflectors, and multilayer interference mirrors. Interference mirrors are frequently based on layered thin-film deposition methods, for instance: physical vapor deposition (includes evaporative deposition or ion beam assisted deposition), chemical vapor deposition, ion beam deposition, molecular beam epitaxy, and sputter deposition. Common materials for interference mirrors are magnesium fluoride, silicon dioxide, tantalum pentoxide, zinc sulfide, silicon oxynitride, compound semiconductors, and titanium dioxide.

Mirrors may be moved with actuators, which generally can be passively thermally adjusting or manually adjusting. In some embodiments, an actuator may comprise a thermally responsive material, meaning a material that has significant expansion/contraction in response to a temperature change compared to glass or silicon so that movement of the thermally responsive material may be used to drive a thermal correction as described herein. The thermally responsive material may be a metal, metal alloy, ceramics, hard plastic material, or composites thereof or a composite assembly such as a fluid driven piston. Examples of metals and metal alloys include one or more of aluminum, brass, bronze, chromium, copper, gold, iron, magnesium, nickel, palladium, platinum, silver, stainless steel, tin, titanium, tungsten, zinc, zirconium, Hastelloy®, Kovar®., Invar, Monel®., Inconel®., and the like. The thermally responsive material may be chosen to have a difference in thermal expansion coefficients relative to the PIC or AWG material or to a separate support structure, with a different in thermal expansion sufficient to induce relative movement of the mirror(s) by expansion/contraction of the actuator. In one embodiment, the difference in thermal expansion coefficients (for example, between a thermally responsive member of an actuator and a monolithically formed PIC and/or AWG) is at least about 100%. In another embodiment, the difference in thermal expansion coefficients is at least about 200%. In yet another embodiment, the difference in thermal expansion coefficients is at least about 300%; artisans will immediately appreciate that all ranges and values within the explicitly stated ranges are contemplated. Manually adjusting actuators can comprise a screw, wedge or other adjustments that can be used to position the mirror to provide the desired optical path through the AWG to take advantage of compact device format for operation at a desired temperature. Regardless of the adjustment mechanism used to position the mirror, the manual actuator generally further comprises an engagement element, such as a flange, angled surface or depression to engage a screw driver, wrench, actuator tool or the like; a key or worm drive element along a shaft to engage a motorized drive; a slide connected to a wedge to move the wedge that may be attached to a linear motorized actuator; or the like. For the manually adjustable embodiments, the relevant structural components can be made from the same materials as each other or materials that have comparable coefficients of thermal expansion.

The actuator can be monolithic in composition, meaning it is made of essentially one material, with essentially in this context meaning that the presence of other materials does not significantly alter the actuator's thermal changes in dimension as designed to perform the actuator's activity in the thermally compensated AWG. Alternatively the actuator may comprise a plurality of integrated or distinct materials that are able to independently expand and contract so that one or the other may be controlling rotation of the mirror. For instance, two thermally responsive materials may be separated by a material having a distinctly different thermal response coefficient.

Alternatively, a plurality of thermally responsive materials may be connected so that their dimensional changes affect movement of the actuator. A bimetallic strip is an example of such an embodiment. For instance, a substantially straight bimetallic strip may exhibit bending or curling in response to thermal changes.

The actuator may be provided in any shape suitable to achieve thermally caused rotation of the mirror. Accordingly, it may be substantially straight, substantially planar, or may alternatively be coiled. For instance, while materials experience thermal expansion/contraction in three dimensions, the actuator may be designed to take advantage of thermal expansion/contraction to effectuate motion in one dimension. For instance, a cylindrical rod of a monolithic material will generally expand and contract about is central axis so that the single dimension of length is controlling, with thermal changes in diameter of the rod being inconsequential based on the design. Alternatively, the actuator may be designed to provide useful thermally driven motion in two dimensions, e.g., a single plane, or in all three dimensions.

The actuator may be provided as an assembly that has a thermally responsive portion and a thermally non-responsive portion. For instance, a holder of a nonresponsive material may be fastened to a thermally responsive material that is free to move. The holder, in turn, is secured in a fixed position relative to a nonmoving portion of the mirror or mirror assembly.

Figure 3A:
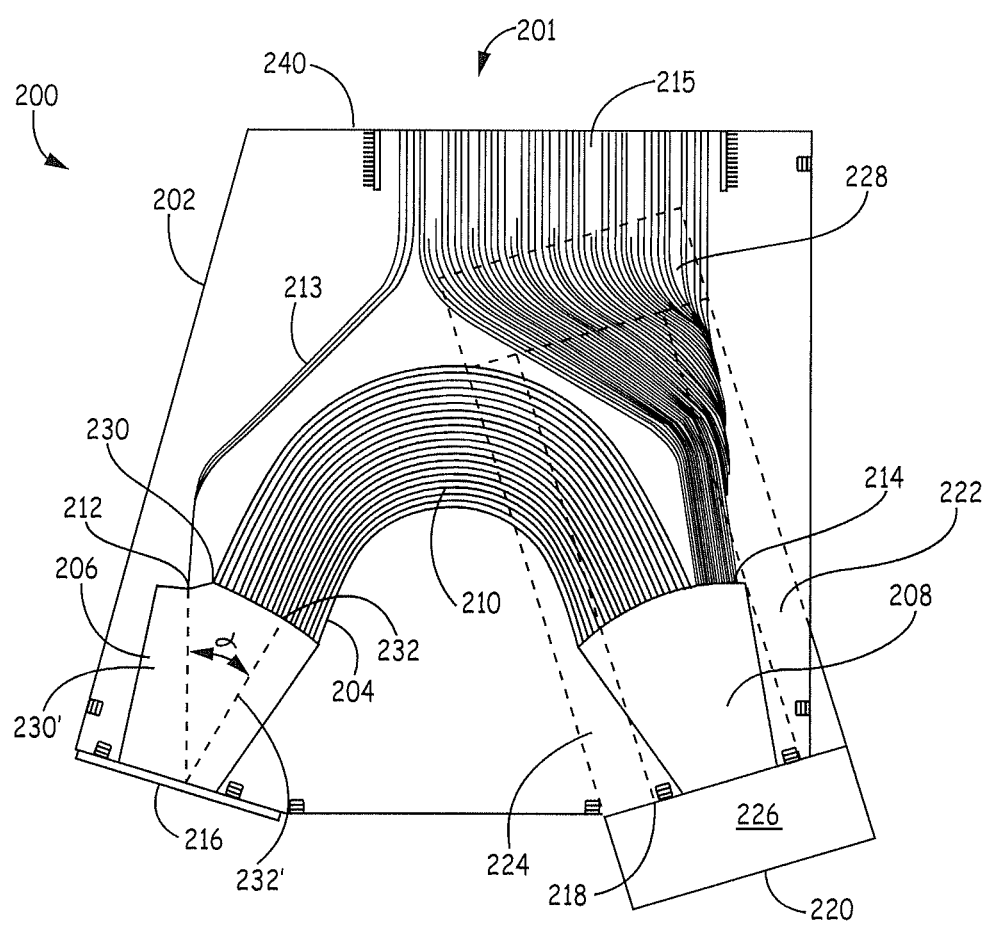
FIG. 3A depicts a plan view of alternative embodiment of a pivotable mirror that provides thermal correction by pivoting a mirror in a circuit.
Figure 3B:
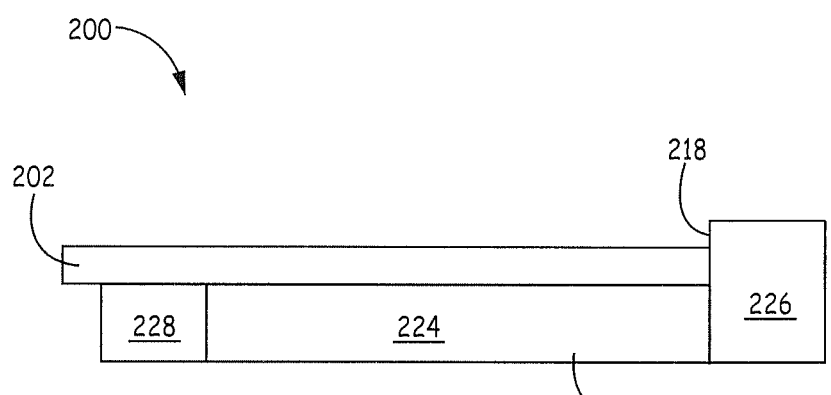
FIG. 3B depicts an elevated side view of the embodiment of FIG. 2A.

An embodiment of a thermally compensating AWG having an alternative actuator embodiment and two folded optical path slab waveguides is depicted in FIGS. 3A and 3B. Optical assembly 200 comprises an optical circuit 201 on a monolithic member 202 that is made of optical glass or other suitable materials. The optical circuit includes an arrayed waveguide grating 204 that is comprised of a first slab waveguide 206 and a second slab waveguide 208 joined by waveguide array 210. First access edge 212 is optically connected to first slab waveguide 206 and second access edge 214 is optically connected to second slab waveguide element 208. In FIG. 3A, the first access edge 212 is joined to the integrative side 213 of circuit 201 and the second access edge 214 is joined to the dispersive side 215 of circuit 201. First slab waveguide 206 comprises mirror 216 and second optical directing element 208 comprises mirror 218. Thermal correction actuator 220 has first and second thermally responsive actuator members 222, 224, joined by linking members (also referred to as struts) 226, 228 made of a material that is thermally nonresponsive and having a coefficient of thermal expansion that is substantially less than the thermal coefficients for members 222 and 224. Strut member 228 is fastened directly or indirectly to monolithic member 202. Linking strut member 226 is connected to mirror 218, with strut member 226 having at least one degree of freedom to move so that its movement pivots mirror 218. Accordingly, strut member 226 may be glued, fused, or integrally formed with mirror 218 or form a static contact opposed by tension.

In use, assembly 200 may be exposed to a change of temperature that could change the performance of arrayed waveguide grating 204. The change of temperature, however, causes thermally responsive members 222 and/or 224 to change in dimension to create a force to pivot strut member 226 to thereby pivot mirror 218. The mirror may pivot about a hinge (not shown) between the mirror and monolithic member 202, or not be restrained by a fixed point of fastening. In one embodiment, the mirror pivots about its center. Alternatively, only one of the members 222, 224 may be made of a thermally responsive material with a relatively large coefficient of thermal expansion, so that the temperature change causes a change in dimension of one of members 222, 224 to control the pivoting. This can provide an embodiment where the mirror pivots about an edge opposite the contact of the responsive member.

Mirror 216, in the embodiment depicted in FIG. 3A, does not move. Alternatively, however, a thermal correction may also be applied to mirror 216 as an alternative to thermally correcting mirror 218. Or a thermal correction may be provided at both ends of the AWG with mirrors 216, 218 both being thermally corrected by movement in response to a change in temperature.

The embodiment of the AWG in FIG. 3A comprises many features that result in an improved compact format for the AWG that can be advantageously used in processing the AWGs from a wafer and for optical devices in a suitable package. Specifically, the AWG comprises two folded optical path slab waveguides, and this provides for a particularly small format for the overall device. Both slab waveguides can be constructed with the ranges of optical angles off of the mirrors as described above and the ranges of distance ratios of the separate branches of the optical paths as noted above. With two folded optical path slab waveguides, channel waveguides for the combined signal and for the disbursed signals are oriented in the same direction. The ability to orient forward waveguide(s) and backward waveguide(s) along adjacent paths due to the angles of the optical paths through the slab waveguides can lead to significant size reductions due to a more compact architecture of the waveguides around the waveguide array. Thus, devices can be constructed with footprints, i.e., planar areas of the devices, can be for example in the range of about 500 $mm^2$ to about 7000 $mm^2$, in further embodiments from about 500 $mm^2$ to about 6000 $mm^2$ and in other embodiments from about 500 $mm^2$ to about 5000 $mm^2$. Corresponding dimensions can range from approximately from 25 mm×40 mm to about 65 mm×85 mm and in further embodiments from about 30 mm×45 mm to about 55 mm×75 mm. These dimensions compare to current commercial device sizes of roughly 80 mm×120 mm. The design techniques described herein also will complement and enhance future size reductions projected for normal progress of PIC technology enabling even smaller device footprints in the future. A person of ordinary skill in the art will recognize that additional ranges of dimensions within the explicit ranges above are contemplated and are within the present disclosure.

Due to the size reduction, the devices can be more effective placed on circular silicon wafers that are generally used for substrates of planar optical circuits. With efficient placement of the smaller devices on a circular wafer, there is reduced waste, and the devices can be oriented for convenient slicing of the wafer. Techniques for irregular cuts of wafers have been developed, as described for example in U.S. Pat. No. 6,705,925 to Cole et al., entitled "Apparatus and Method to Dice Integrated Circuits from a Wafer Using a Pressurized Fluid Jet," incorporated herein by reference. While such fluid jet cutting techniques can be used for the devices described herein, efficient straight edge cutting techniques can be used for the smaller devices described herein without wasting undesirably large amounts of wafer space. Thus, with the smaller devices described herein, blade dicing, scribe-and-cleave, or etch-and-cleave singulation can be effectively used to cut the devices to provide significant manufacturing advantages without wasting large amounts of silicon wafer material.

All of the connecting waveguides can then be efficiently brought to a common edge of the PLC, which is edge 240 in FIG. 3A. This design provides for reasonable patterning of the waveguides during processing and for convenient connections to the PLC by appropriate collections of optical fibers or the like for use of the resulting device.

Figure 4:
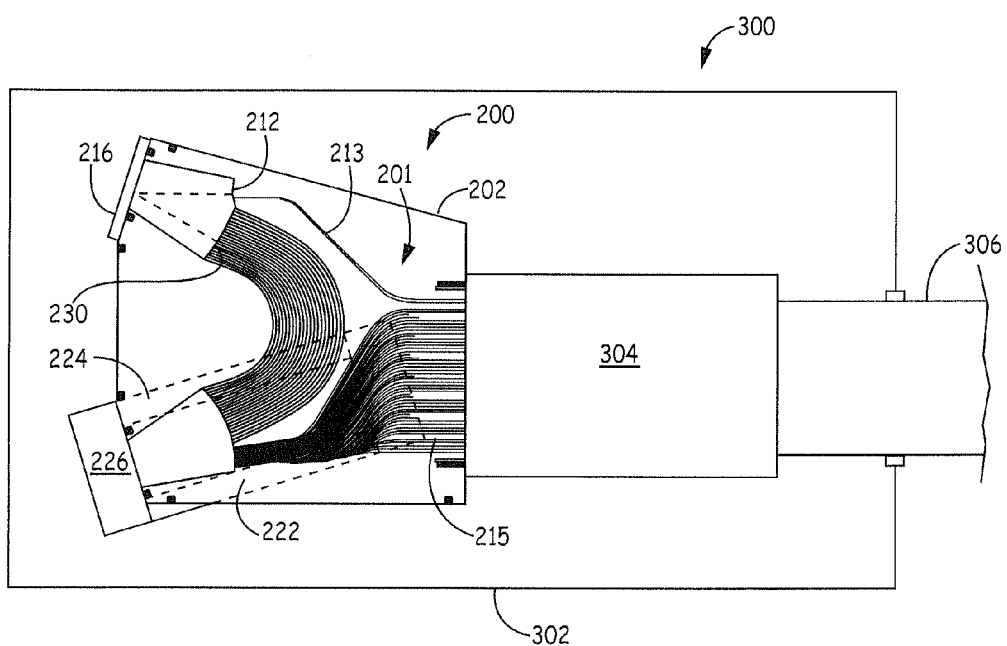
FIG. 4 depicts a cross-sectional plan view of a package containing the embodiment of FIG. 3A.

The thermally compensated AWG may be part of a package. FIG. 4 depicts package 300 with thermally compensated AWG 200 and actuator 220 inside within an enclosure 302. The enclosure can have suitable thermal properties such that the AWG chip is effectively at a uniform temperature through the slow transfer of heat to the chip such that transient temperature responses are less likely to alter device performance. The AWG is connected via internal connector 304 to optical signal carrier 306, such as an optical fiber grouping or ribbon, which also has a connector (not shown) at an opposite end for connection to another optical communication device. The fiber ribbon can exit enclosure 302 through an elastic boot 310, such as a rubber gasket or the like, to reduce interaction between the rigid enclosure and the fiber ribbon. The package 300 is network-ready for connection with an optical signal carrier to provide D/MUX functions. The mass of AWG 200 can be relatively low compared to the other components so that the AWG may be designed to float inside the package, with monolithic structure 202 not being connected directly to the package other than being fastened to connector 302. Carrier 304 may include optical signal carriers for both dispersive 215 and integrative 213 sides of circuit 201.

The thermally compensated AWG assembly described herein can have a reduced volume that is a result of the folded configuration of the optic slab waveguides (or other optical directing components) in the AWG. The folded optics can have a further reduced dimension by virtue of directing optical signals in and out of the slab waveguide along adjacent faces, as at FIG. 3A, which depicts a slab waveguide with faces 230, 232 with the normal lines of these faces 230', 232', having an angle between them of approximately 45 degrees, labeled as α (alpha). Then, light enters and leaves through the faces at near normal to the surface to reduce any scattering loss at the surface. Since the angle alpha is relatively small, much of the optical propagation region of the slab waveguide is folded back over itself, and adjacent faces 128, 130 can provide for a small format of the slab waveguide. Since the angle alpha is small, a single flat face 140 can be used, as shown in FIG. 1, without significant loss of signal. These, or other folded configurations, may be complemented by the footprint-saving configuration of the actuator for making a thermal correction. Moreover, the AWG and D/MUX circuit may be a monolithic structure of minimal dimensions formed by deposition and dicing processes.

Figure 5A:
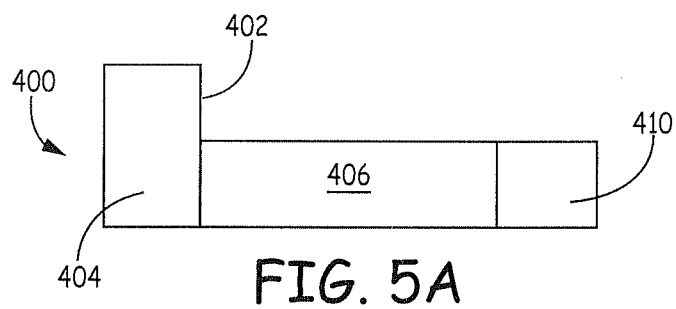
FIG. 5A is a side view of an alternative embodiment of a thermally pivotable mirror.
Figure 5B:
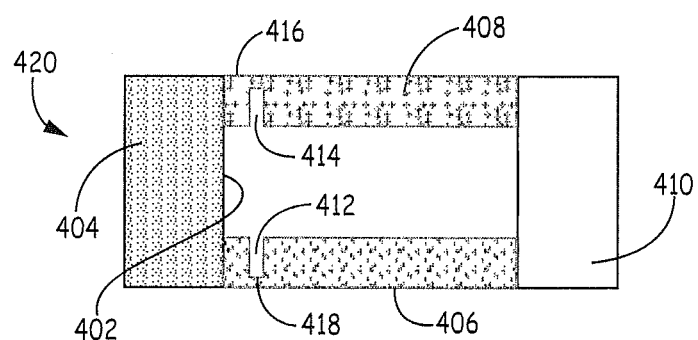
FIG. 5B is a plan view of the embodiment of FIG. 5A in a first position.
Figure 5C:
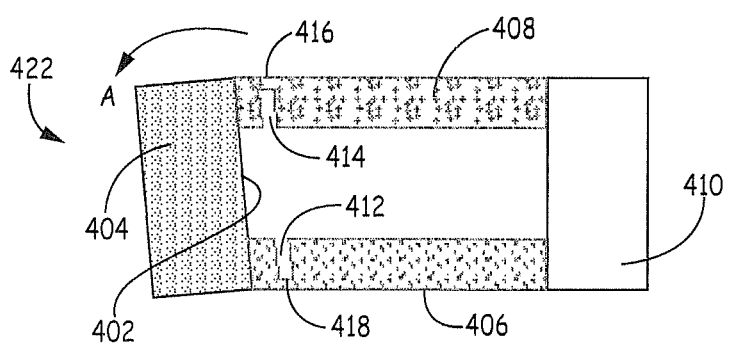
FIG. 5C is a plan view of the embodiment of FIG. 5A in a second position.

FIG. 5 depicts an alternative embodiment of a mirror assembly for thermal correction of an AWG. Mirror assembly 400 has reflective surface 402 mounted on mount 404 that is joined to first arm 406 and second arm 408 that are in turn joined to strut 410. One of the arms, or in the embodiment depicted, each arm, has a slot 412, 414 for arm 406, 408, respectively. The portions of arm 406, 408 adjacent to slot 412, 414, are hinges 416, 418. Assembly 400 is mounted so that reflecting surface 402 is positioned to reflect light to and from a slab waveguide. As the temperature increases, the assembly moves from first position 420 to second position 422, as arm 408 tends to expand more than arm 406, and reflecting surface 402 rotates, as depicted by arrow A in FIG. 4C. The dimensions of slots 412, 414 are changed as arms 414, 412 change dimensions. As the temperature decreases, the mirror and slots pass through position 420 and arm 408 shrinks relatively more than arm 406 so that reflecting surface 402 is pivoted opposite the direction indicated by arrow A. Materials and dimensions may be chosen for the arms to provide the desired amount of pivoting. The arms may be chosen to have thermal coefficients of expansion that are different, with the more responsive one having between 105% and 300% of the coefficient of the other, or others in the system; artisans will immediately appreciate that all the ranges and values within the explicitly stated ranges are contemplated.

The planar optical circuits can be formed using chemical vapor deposition (CVD) or other deposition process on a wafer, as described further below. After completing the formation of the optical circuit, the wafer generally is diced, and a mirror (with a suitably reflective material) may be applied at the diced edge, which can be polished prior to positioning the mirror. The dicing of the wafer or other substrate can be performed using a saw, water jet, laser or other suitable cutting tool or technique. Or the mirror assembly may be configured and integrated with the AWG and circuit in combination with an actuator. In general, a plurality of circuits is formed on a single wafer, and the small foot print described herein provides for the formation of more AWG circuits on a single wafer. This higher packing of AWG circuits on a single wafer reduces material costs for each AWG associated with the wafer and provides for the processing of a greater number of circuits at a time since processing cost is generally metered to the number of wafers, which amortizes processing costs and capital costs for processing equipment, such as deposition chambers across the greater number of AWGs. In summary, the reduced footprint of the optical circuits provides for higher production efficiency with associated cost and manufacturing savings.

Figure 6A:
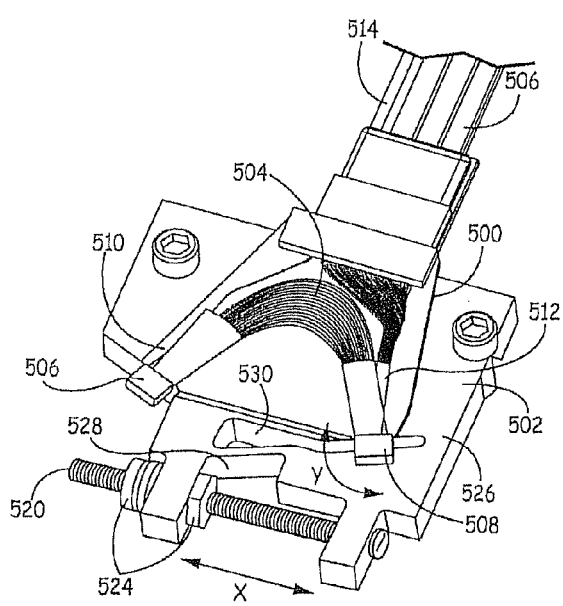
FIG. 6A is a perspective view of a thermally compensated arrayed waveguide having a pair of folded slab waveguides and a thermally correcting pivotable mirror.

Another embodiment of a thermally compensated AWG is depicted in FIG. 6A. Monolithic planar lightwave circuit (PLC) 500, which is similar to the chip of FIG. 3A, is attached to base 502. The PLC 500 has a thermally compensating AWG 504 that comprises first mirror assembly 506 attached to AWG 504 and second mirror assembly 508 attached to base 502. Mirror assemblies 506, 508 are comprised of mirrors with a reflecting surface disposed as a member of folded waveguides 510, 512. Mirror assembly 506 is fixed in position. External optical waveguides 514, 516 provide optical communication for PLC 502 with a network or other components. Base 502 comprises actuator 520 that fastened to the base, e.g., with threads and nuts 524. Base 502 also has a first neck 526 and second neck 528. Hole 530 is adjacent to both necks and defines at least one side of each neck. Actuator 520 comprises a thermally responsive material. As the temperature changes, actuator 520 expands or contracts as indicated by arrow X. This movement causes pivoting of mirror assembly 508 as indicated at arrow Y. Necks 526, 528 provide relatively smaller cross-sectional areas that are acted upon by forces generated by the actuator, and the small areas provide for pivoting/bending at the necks to provide for corresponding pivoting of mirror assembly 508. The compact size of AWG 504 and the folded slab waveguide 512 in particular, allows for small rotations of the mirror in mirror assembly 508 to provide a thermal correction. Forces from expansion/contraction of actuator 520 are distributed through base 502 but are also concentrated by the necks so that a smooth and predictable change with temperature is achieved.

The planar lightwave circuit shown in FIG. 6A can be adapted with a manual adjusting actuator. A planar lightwave circuit with a manually adjusting actuator is shown in a fragmentary FIG. 6B, with features common with the device of FIG. 6A not shown. Referring to FIG. 6B, base 540 comprises actuator 542 that fastened to the base, e.g., with threads and nuts 544. Base 540 also has a first neck 546 and second neck 548. Hole 550 is adjacent to both necks and defines at least one side of each neck. Actuator 542 can be formed from the same material as other portions of base 540 or from a material with a similar coefficient of thermal expansion. Actuator can comprise a head 552 with an engagement element 554, such as a flange to engage a screw driver, a shaped surface to engage a wrench or the like. A person or ordinary skill in the art will recognize that other manual adjustment designs can be used based on knowledge in the art to take advantage of the compact design of the AWG device without providing passive thermal adjustment.

In some manual actuation embodiments, it can be desirable to use a motorized actuation system for the manual adjustments to avoid personal interaction of a user. An embodiment with motorized manual actuation is shown in FIG. 6C. As with FIG. 6B, features common with the device of FIG. 6A are not shown. Referring to FIG. 6C, base 570 comprises actuator 572 that fastened to the base, e.g., with threads and nuts 574. Base 570 also has a first neck 576 and second neck 578. Hole 580 is adjacent to both necks. Actuator 572 can be formed, for example, from the same material as other portions of base 570 or from a material with a similar coefficient of thermal expansion. Actuator 572 can comprise a stop 582 that engages post 584 such that rotation of actuator 572 can change the relative distance of posts 584, 586. Motorized drive 588, such as a stepper motor or the like, can be used to control the rotation of actuator 572 and thereby control the position of mirror 508. Motorized drive 588 can be controlled with controller 590, which can comprise a microprocessor or other control circuit. Controller 590 can comprise or be connected to a thermocouple or other temperature measuring device, and in some embodiments, the measured temperature can be used to determine the control of actuator 572.

Figure 6D:
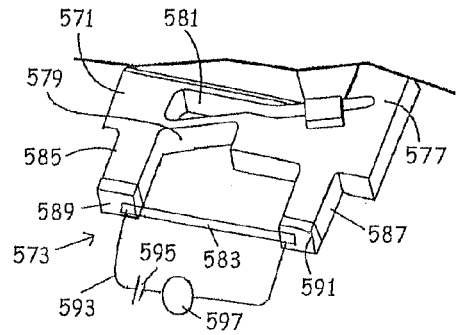
FIG. 6D is a fragmentary perspective view of a manually adjustable actuator adapted into the AWG device design of FIG. 6A with a shape memory alloy that adjusts in response to an electrical current to provide the desired manual adjustment.
Figure 6B:
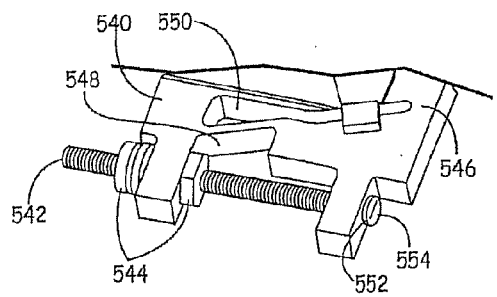
FIG. 6B is a fragmentary perspective view of a manually adjustable actuator adapted into the AWG device design of FIG. 6A.
Figure 6C:
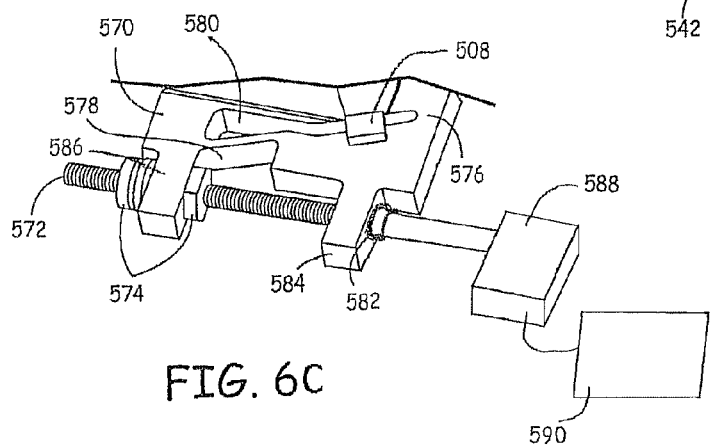
FIG. 6C is a fragmentary perspective view of a manually adjustable actuator adapted into the AWG device design of FIG. 6A with a motorized manual adjustment.

An embodiment based on a shape memory alloy is shown in FIG. 6D. As with FIG. 6B, features common with the device of FIG. 6A are not shown. Referring to FIG. 6D, base 571 comprises actuator 573 that fastened to the base, e.g., with adhesives, clamps, welds or other suitable fastener. Base 571 also has a first neck 577 and second neck 579. Hole 581 is adjacent to both necks. Actuator 572 can comprise a bar 583 that connects post 585 and 587 such that change in shape of actuator bar 583 can change the relative distance of posts 585, 587. Actuator bar 583 connects with posts 585, 587 at electrically insulating pads 589, 591. Actuator bar 583 generally comprises a shape memory metal that adjusts its shape in response to electrical current. Actuator 573 further comprises an electrical circuit 593 that comprises a power supply 595, such as a battery or transformer and a control circuit 597. A person of ordinary skill in the art will recognize that the motorized control of the actuator in FIG. 6C or the shape memory alloy control of the actuator in FIG. 6D can be adapted for the control of other embodiments of the folded AWG described herein. Also, alternative embodiments providing motorized control of manual adjustments can be adapted to replace the specific embodiment in FIG. 6C for the control of mirror 508. The necks are pivot points by which movement of the base is achieved upon actuator extension or contraction. Accordingly, embodiments of the invention comprise PLCs mounted on a base having a plurality of portions joined by a plurality of pivot points, e.g., two points, with one or more actuators also joining the portions.

Figure 7A:
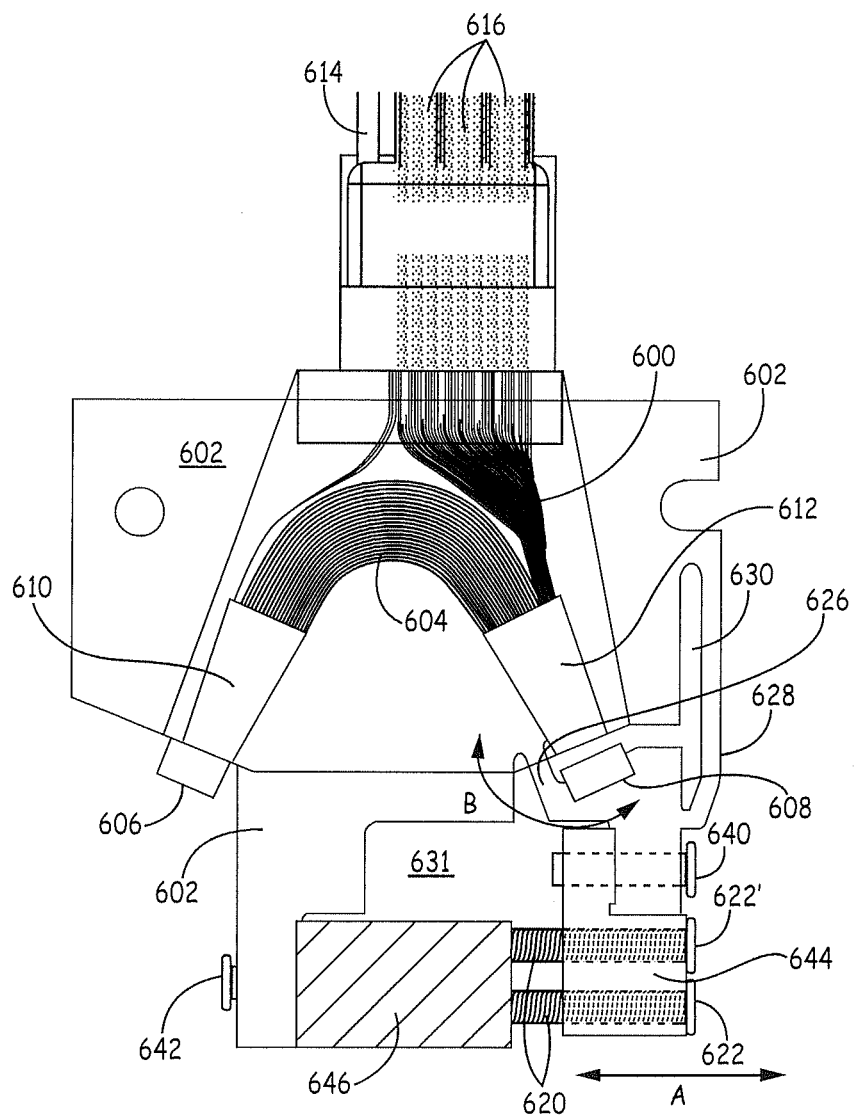
FIG. 7A is a perspective view of an alternative embodiment of an thermally compensated arrayed waveguide having a pair of folded slab waveguides and a thermally correcting pivotable mirror.

Another embodiment of a thermally compensating AWG is depicted in FIG. 7A. Monolithic PLC 600 is attached to base 602. The PLC 600 has a thermally compensated AWG 604 that comprises first mirror assembly 606 attached to AWG 604 and second mirror assembly 608 attached to base 602. Mirror assemblies 606, 608 comprised of mirrors with a reflecting surface disposed as a member of folded waveguides 610, 612. External optical waveguides 614, 616 provide optical communication for PLC 600 with a network or other components. Base 602 comprises actuators 622, 622' that are fastened to the base. Base 602 also has a first neck 626 and second neck 628. Hole 630 is adjacent to both necks and defines at least one side of each neck, and hole 631 is adjacent neck 626. Actuators 622, 622' comprise a thermally responsive material; the actuators may have the same or different materials. One or both of actuators 622, 622' may be installed under compression, with base portions 644, 646, being forced apart; accordingly, members 644, 646 would thus be biased to contract towards each other. Alternatively, however, an actuator that provides correction under contraction may be fastened to both 644 and 646 to provide force to move 644 and 646 towards each other under contraction.

As the temperature changes, actuators 622, 622' expand or contract as indicated by arrow A. This movement causes rotation of mirror assembly 608 as indicated at arrow B. Necks 626, 628 provide relatively smaller cross-sectional areas that are acted upon by forces generated by the actuator. The compact size of AWG 604 and folded slab waveguide 612 in particular, allow for small rotations of the mirror in mirror assembly 608 to provide a thermal correction. Forces from expansion/contraction of actuators 622, 622' are distributed through base 602 but are also concentrated by the necks so that a smooth and predictable change with temperature is achieved. Calibration screws 640, 642, provide for calibration to set distances.

A thermally compensated AWG may be equipped with a plurality of actuators, with one of the actuators having a coefficient of thermal expansion larger than another one, e.g., from about 5% larger to about 300% larger; artisans will immediately appreciate that all the ranges and values within the explicitly stated ranges are contemplated, e.g., at least about 5% or from about 10% to about 50%. At least one of the actuators may additionally or alternatively have a different mechanical advantage to another such that the rate of mirror rotation with actuator expansion is different between them The actuators may cooperate so that one of the actuators dominates to provide a selected thermal correction over a first range of temperature and another of the actuators dominates to provide a selected thermal correction over a second range of temperatures, with the temperature ranges being distinct from each other. For instance, a first actuator may provide a selected correction for a temperature increase relative to room temperature (about 20° C.) and a second actuator provide a selected correction for a temperature decrease relative to room temperature.

Figure 7B:
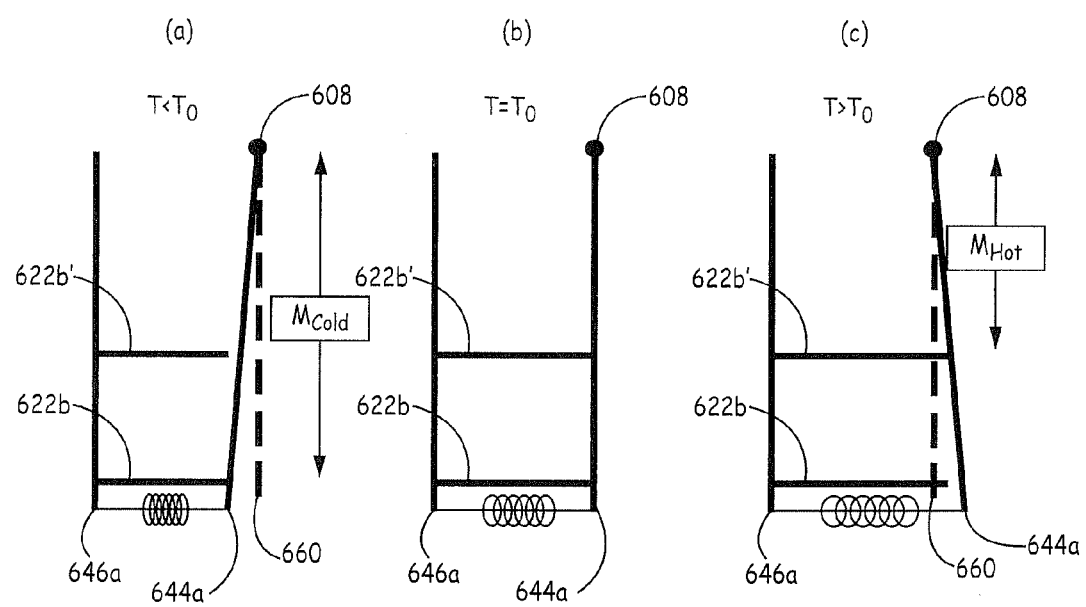
FIG. 7B is a schematic showing action of actuators in the embodiment of FIG. 7A.

Thus, for example, thermally compensating AWG 604 of FIG. 7A may be equipped with actuators 622, 622' that are designed to operate over different temperature ranges. Schematic depictions of operation of a dual actuator thermal compensation are shown in FIG. 7A. Generally, actuators 622 and 622' can designed to have equivalent coefficients of thermal expansion, but due to the different lever arms relative to the pivot point, the actuators can operate with different thermal response. The temperature $T_0$ is the temperature at which the thermal response transitions between the control of the two actuators. FIG. 7B panel (b) shows the system at a neutral position at a calibrated temperature $T_0$, e.g., room temperature. As temperature decreases from the calibrated temperature, actuators 622b, 622b' both contract. Due to the different lever arms, only actuator 622b, controls the pivoting of the mirror over this temperature range. Accordingly, mirror assembly 608 is pivoted in a clockwise direction determined by contraction of bar 622b. When temperature increases above $T_0$, both actuators expand. Due to the different lever arms, actuator 622b' controls movement of mirror 608, as indicated by bar 622b' engaging 644a in panel (c) of FIG. 7B.

Expansion of 622b' pivots mirror assembly 608 in a counter-clockwise direction. Thus, the individual actuator arms control the movement of the mirror over different temperature ranges: 622b over $T<T_0$ and 622b' over $T>T_0$.

Figure 8:
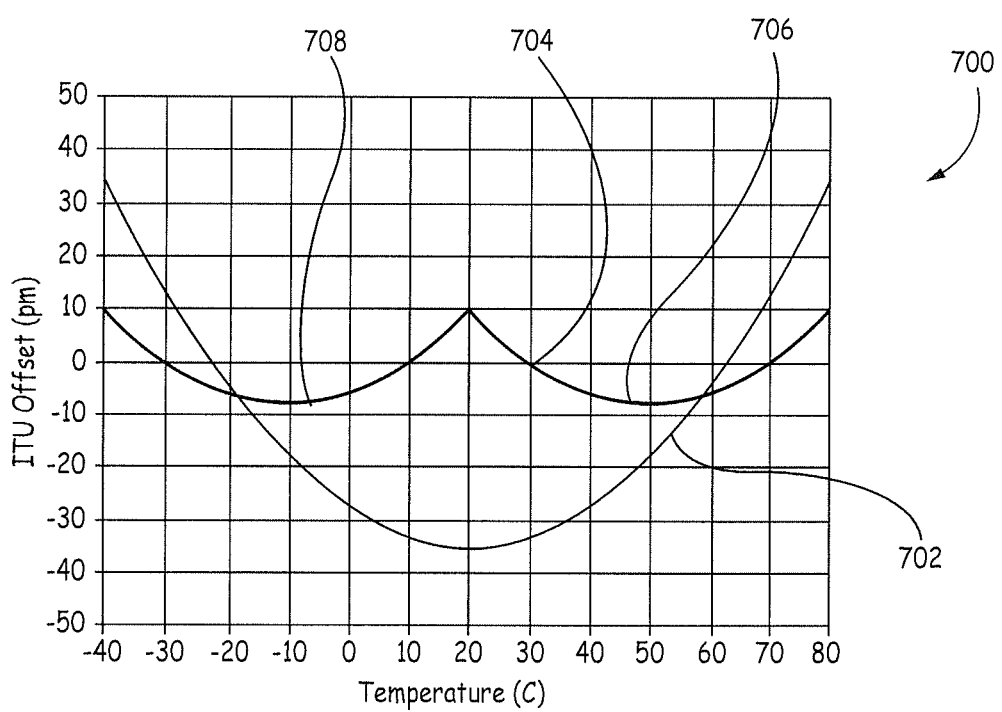
FIG. 8 is a plot of a model of the thermally compensated performance of thermally compensated arrayed waveguides as corrected by the embodiments of FIGS. 6 and 7A.

FIG. 8 is a plot 700 of a model of a thermally compensating AWG made with a thermally pivoting mirror and folded slab waveguide as set forth herein. The abscissa is temperature in degrees Centigrade. The ordinate is the deviation from ideal transmission conditions provided by the assembly, and is expressed, for instance, as picometers of ITU offset. ITU stands for International Telecommunications Union, which provides a standard for the ideal grid wavelength for dense wavelength-division multiplexing. The acceptable absolute value of the ITU-offset depends on the application. Thus some applications may tolerate an absolute value of the ITU of no more than about 50 pm, and in some embodiments no more than about 20 or about 30 pm. Curve 702 is the theoretically estimated offset for AWG 504 corrected with single actuator 520. The AWG is tuned to 20° C. (the minimum of the curve); the AWG is effectively thermally compensated, with the deviation from the ideal ranging 0 to about 35 ITU offset pm over a range of −40 to 80° C. The minimum of the curve may be moved as desired by tuning of the AWG, and other deviations over other ranges may be obtained. Curve 704 is the theoretically estimated offset for AWG 604 and is a combination of curves 706, 708, and shows control that may be obtained in a dual actuator system. Curve 706 shows the AWG corrected by first actuator 622' in response to an increase in temperature, and curve 708 shows the AWG corrected by second actuator 622 in response to a decrease in temperature. Curves 706, 708 may be tuned with the reference temperature as depicted, or the curves may be shifted based on an alternative reference temperature.

Figure 9:
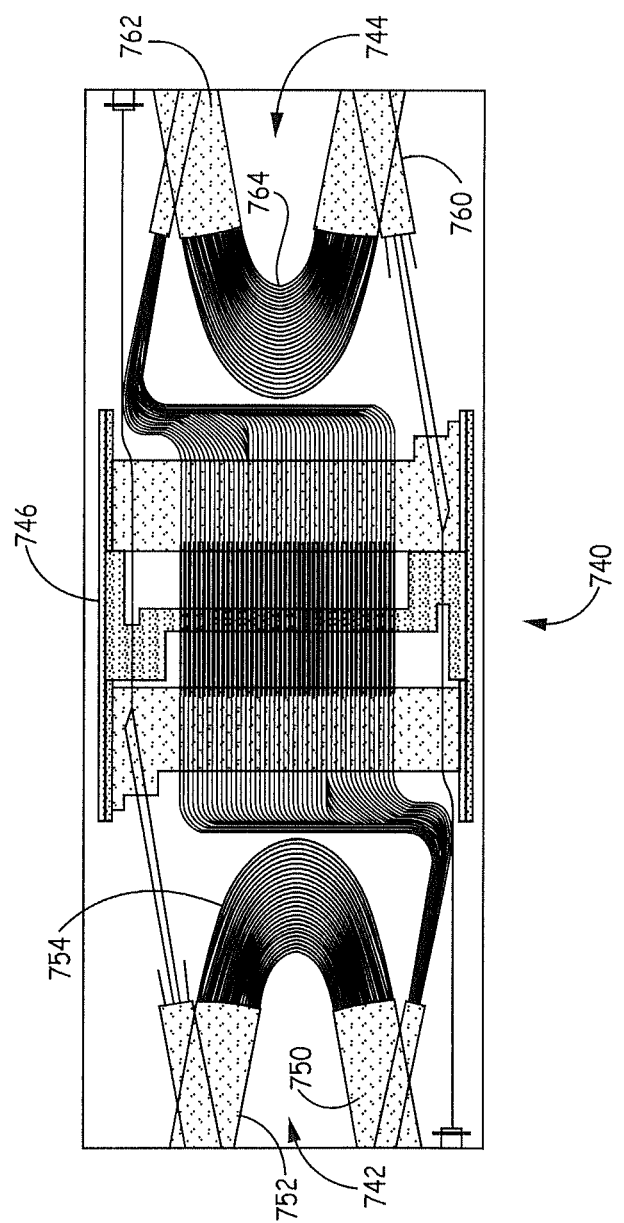
FIG. 9 is a top view of an embodiment of a chip having two AWGs on a single chip.

In some embodiments, it can be desirable to integrate two or more AWGs on a single chip to take advantage of the powerful capability of PLC technology to integrate multiple optical components on a single chip. A representative PLC chip with two AWGs is shown in FIG. 9. Specifically, chip 740 comprises first AWG 742, second AWG 744 and optical switching elements 746 to provide, for example, reconfigurable add-drop multiplexing capabilities. First AWG 742 comprises a first folded slab waveguide 750, second folded slab waveguide 752 and waveguide array 754, and second AWG 744 comprises a first folded slab waveguide 760, second folded slab waveguide 762 and waveguide array 764. Each folded slab waveguide 750, 752, 760, 762 is associated with a suitable mirror, which may or may not pivot to provide temperature compensated operation. In some embodiments, at least one mirror associated with each AWG pivots to provide thermal compensation. The precise design of optical switching elements 746 is not relevant to the current discussion and can be selected by a person of ordinary skill in the art to accomplish the particular objectives of the device. However, the thermal compensation of each AWG provides for the adjustment of the center wavelengths of each AWG by offsetting the nominal reflection angle independently within each AWG to provide for desired error reduction of the overall device. The ability to put two tuned AWGs on a single chip provides for substantial size-reduction and chip packing density for multiple-AWG circuits.

In general, one or more actuators can thus operatively join a first portion and a second portion of a base. One portion of a base has a mirror that participates in a PLC that is formed directly in the other portion of the base. Alternatively, the PLC is part of a structure that is mounted to the other portion of the base. Operative joining can be made by fastening one or more actuators to one and/or both portions. Fastening may be by adhesive, threading, or other convenient means. The portions may be biased, either by the actuator(s) or other structures. Movement of the actuator(s) moves the base portions relative to each other to pivot the mirror. The pivoting provides a thermal correction.

The materials for forming the PLC can be deposited on a substrate using CVD, variations thereof, flame hydrolysis or other appropriate deposition approach. Suitable substrates include, for example, materials with appropriate tolerance of higher processing temperatures, such as silicon, ceramics, such as silica or alumina, or the like. In some embodiments, suitable silicon dioxide precursors can be introduced, and a silica glass can be doped to provide a desired index of refraction and processing properties. The patterning can be performed with photolithography or other suitable patterning technique. For example, the formation of a silica glass doped with Ge, P and B based on plasma enhanced CVD (PECVD) for use as a top cladding layer for a PLC is described in U.S. Pat. No. 7,160,746 to Zhong et al., entitled "GEBPSG Top Clad for a Planar Lightwave Circuit," incorporated herein by reference. Similarly, the formation of a core for the optical planar waveguides is described, for example, in U.S. Pat. No. 6,615,615 to Zhong et al., entitled "GEPSG Core for a Planar Lightwave Circuit," incorporated herein by reference. The parameters for formation of an appropriate waveguide array are known in the art.

The thermally compensating AWGs may be part of a network. An optical network can comprise a network connection, a plurality of user optical service connections and a D/MUX structure, such as an arrayed waveguide grating, optically connecting the network connection and the plurality of user optical service connections. The network connection comprises one or more common optical connections. The common connections are generally optically connected to common channels that transmit multiple wavelength optical signals over a network, which in some embodiments can involve significant distances. In some embodiments, the user optical connections can comprise separate connections associated with an input and output signals from the user, although the output signal can be a broadband signal such that the multiplexing operation selects the appropriate wavelength for transmission for that user.

In general, the D/MUX structures described herein can be effectively used as a component of a passive optical network (PON), for example to provide an interface at a branch in a network, such as at a termination of the network. In a passive optical network, passive optical components provide traffic routing between a Central Office and termination points, which can be at user/customer premises. In general, networks can provide one or more of voice, video and data services, which can be provided by multiple service providers. For example, the optical network can provide for transmission of broadband internet service provided by an internet service provider. However, the D/MUX structures described herein can be used for the connection of alternative network branch segments, in addition or as an alternative to providing an interface with direct user/customer channels. In embodiments in which a direct interface is provided to user connections, the user connections can be directly or indirectly connected to appropriate transmitters and receivers, which respectively originate or terminate a signal.

Planar optical circuits provide convenient, easily integrated, and compact formats for optical communication components. Arrayed waveguide gratings (AWG) provide D/MUX functions within a planar optical circuit format. The planar AWG structure can be integrated with additional planer devices and/or interfaced with appropriate external optical elements to provide desired integration into the network.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A method for adjusting the optical path through a dispersive element of a planar lightwave circuit comprising:
a combined signal waveguide;
a set of dispersed signal waveguides;
a first slab waveguide;
a first mirror optically connected to the first slab waveguide;
a mirror assembly supporting the first mirror;
a waveguide array; and
a second slab waveguide,
wherein the waveguide array optically connects the first slab waveguide and the second slab waveguide to provide an arrayed waveguide grating (AWG), wherein the combined signal waveguide or the set of dispersed signal waveguides is optically connected at an access edge to the first slab waveguide and the other of the combined signal waveguide or the set of dispersed signal waveguides is optically connected to the second slab waveguide and wherein an optical path through the first slab waveguide from the access edge is folded by providing an optical reflection from the first mirror to the array edge connecting the waveguide array and the appropriate element of the combined signal waveguide or the set of dispersed signal waveguides, and wherein the mirror assembly comprises a manually adjustable actuator that sets the wavelength response of the AWG by tuning the position of the central wavelength optical path, the method comprising:
adjusting the actuator through external manipulation to move the first mirror to alter the optical path between the combined signal waveguide and the dispersed signal waveguides.

2. The method of claim 1 wherein the configuration of the reflection off of the first mirror is at a reflection angle of no more than about 80 degrees and the ratio of optical path distance from the access edge to the first mirror as compared to the optical path distance from the waveguide array to the first mirror being from about 0.5 to about 2.

3. The method of claim 1 wherein the manual adjustment is performed with a hand tool that engages the actuator.

4. The method of claim 1 wherein the manual adjustment is performed with a motorized drive that engages the actuator to provide the desired adjustment.

5. The method of claim 4 wherein the motorized drive is connected to a controller comprising a microprocessor.

6. The method of claim 5 wherein the controller is operably connected to a temperature sensor.

7. The method of claim 1 wherein the waveguides of the planar lightwave circuit are within a single monolithic member comprising an optical glass and the minor assembly is fastened to the monolithic member by a connecting strut.

8. The method of claim 1 wherein the reflection angle is within the range from about 3 degrees to about 70 degrees.

9. The method of claim 1 wherein the ratio of the optical path distance from the access edge to the first mirror to the optical path distance from the waveguide array to the first mirror being within the range from about 0.75 to about 1.5.

10. The method of claim 1 wherein the combined signal waveguide is optically connected at the access edge to the first slab waveguide.

11. The method of claim 1 wherein the disbursed signal waveguides are optically connected at the access edge to the first slab waveguide.

12. The method of claim 1 wherein the second slab waveguide comprises a second movable mirror and wherein thermal responsive movements by both the first mirror and the second movable mirror collectively provide effective thermally compensated transmission of light through the circuit.

13. The method of claim 12 wherein the planar lightwave circuit further comprises an enclosure having a foot print within the range from about 5000 mm$^2$ to about 500 mm$^2$, wherein the planar lightwave circuit provides for operation over a wavelength range from about 1250 nm to about 1650 nm and wherein the enclosure exposes optical connectors providing direct or indirect optical connection to fiber optics relating to combined optical signals and dispersed optical signals.

14. The method of claim 13 wherein the combined signal waveguide and the disbursed signal waveguides interface a common edge.

15. The method of claim 1 wherein the arrayed waveguide grating is mounted on a base, with the mirror assembly being mounted on the base, and with the actuator being mounted on the base.

16. The method of claim 1 wherein the manually adjustable actuator comprises a shape memory alloy operably connected to an electrical circuit and wherein adjusting the actuator comprises correspondingly adjusting current flow to the shape memory alloy.

* * * * *

UNITED STATES PATENT AND TRADEMARK OFFICE
CERTIFICATE OF CORRECTION

PATENT NO. : 9,110,232 B2  
APPLICATION NO. : 13/951656  
DATED : August 18, 2015  
INVENTOR(S) : McGinnis et al.

Page 1 of 1

It is certified that error appears in the above-identified patent and that said Letters Patent is hereby corrected as shown below:

In the claims  
Claim 7, Column 20, Line 64 "minor assembly" deleted and replaced with --mirror assembly--.

Signed and Sealed this  
Ninth Day of February, 2016

Michelle K. Lee  
*Director of the United States Patent and Trademark Office*